(12) United States Patent
Bich et al.

(10) Patent No.: US 7,992,374 B1
(45) Date of Patent: Aug. 9, 2011

(54) AGRICULTURAL PLANT CUTTING HEADER WITH FORE AND AFT ADJUSTABLE FLEXIBLE CUTTERBAR HAVING AUTOMATIC PRELOAD ADJUSTMENT

(75) Inventors: Gary L. Bich, New Holland, PA (US); James F. Rayfield, New Holland, PA (US); Karl W. Klotzbach, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/754,754

(22) Filed: Apr. 6, 2010

(51) Int. Cl.
*A01D 67/00* (2006.01)
(52) U.S. Cl. ........................................... 56/208
(58) Field of Classification Search .................. 56/208, 56/181, 14.4, 15.7, 192, DIG. 11
See application file for complete search history.

(56) References Cited

U.S. PATENT DOCUMENTS

| | | | | |
|---|---|---|---|---|
| 3,982,383 | A | | 9/1976 | Mott |
| 4,011,709 | A | * | 3/1977 | Mott et al. ..................... 56/10.4 |
| 4,191,006 | A | | 3/1980 | Kerber et al. |
| 4,206,583 | A | | 6/1980 | Week et al. |
| 4,206,584 | A | * | 6/1980 | Johnson et al. ............... 56/15.8 |
| 4,227,363 | A | | 10/1980 | Kerber et al. |
| 4,441,307 | A | * | 4/1984 | Enzmann ........................ 56/208 |
| 4,473,993 | A | * | 10/1984 | Jennings et al. ................ 56/208 |
| 4,573,308 | A | * | 3/1986 | Ehrecke et al. ................ 56/14.4 |
| 4,599,852 | A | * | 7/1986 | Kerber et al. .................. 56/15.8 |
| 4,665,685 | A | * | 5/1987 | Rupprecht ..................... 56/208 |
| 5,327,709 | A | | 7/1994 | Webb |
| 5,359,836 | A | | 11/1994 | Zeuner et al. |
| 5,937,621 | A | | 8/1999 | Eggenhaus |
| 6,029,429 | A | | 2/2000 | Fox et al. |
| 6,041,583 | A | | 3/2000 | Goering et al. |
| 6,782,683 | B2 | * | 8/2004 | Buermann ..................... 56/257 |
| 7,520,115 | B2 | * | 4/2009 | Coers et al. ................... 56/15.8 |
| 7,730,702 | B2 | * | 6/2010 | Mortier et al. ................ 56/13.6 |
| 7,802,417 | B2 | * | 9/2010 | Sauerwein et al. ............ 56/181 |
| 2003/0000193 | A1 | | 1/2003 | Beck et al. |
| 2009/0293441 | A1 | * | 12/2009 | Sauerwein ..................... 56/208 |
| 2010/0043374 | A1 | * | 2/2010 | Sethi .............................. 56/181 |
| 2010/0083629 | A1 | * | 4/2010 | Klotzbach et al. ............ 56/320.1 |

* cited by examiner

*Primary Examiner* — Árpád Fábián-Kovács
(74) *Attorney, Agent, or Firm* — Michael G. Harms; Patrick M. Sheldrake

(57) ABSTRACT

A flexible cutterbar header for an agricultural plant cutting machine, includes a plurality of elongate, telescoping support arms pivotally connected to a floor of the header and supporting a flexible cutterbar for upward and downward, and fore and aft movements relative thereto, apparatus extending between at least some of the support arms configured and operable for controlling the telescoping thereof substantially uniformly, and a preload adjusting system configured and operable for applying a preload force against the cutterbar through the support arms in a manner to automatically increase as the support arms telescopically increase in length, and automatically decrease as the support arms telescopically decrease in length.

19 Claims, 8 Drawing Sheets

AGRICULTURAL PLANT CUTTING HEADER WITH FORE AND AFT ADJUSTABLE FLEXIBLE CUTTERBAR HAVING AUTOMATIC PRELOAD ADJUSTMENT

TECHNICAL FIELD

This invention relates generally to a header for an agricultural plant cutting machine, and more particularly, to a header with a fore and aft adjustable flexible cutterbar and which automatically adjusts a preload force exerted against the cutterbar as a function of the fore and aft position thereof.

BACKGROUND ART

An agricultural plant cutting machine, such as, but not limited to, a combine or a windrower, generally includes a header operable for severing and collecting or gathering plant or crop material as the machine is driven over a field. The header will have a plant cutting cutterbar for severing the plants or crops, which will typically comprise an elongate sickle mechanism sidewardly reciprocatingly movable relative to a non-reciprocating guard structure. On some headers, the cutterbar and guard structure are flexible, that is, capable of flexing upwardly and downwardly at locations along the width of the header, to facilitate operation while in contact with the ground along the width of the header, and while enabling conforming to and accommodating irregularities and unevenness in the ground surface.

Typically, a flexible cutterbar is supported at spaced locations along its length on forward ends of pivoting support arms having rear ends which pivotally connect to the header. The individual pivotability of the support arms enables the respective locations of the cutterbar to flex individually, downwardly and upwardly for conforming to or accommodating ground surface irregularities, and, if the header is equipped with an automatic height control system, for triggering operation of that system.

A ground contour following capability of a flexible cutterbar can be enhanced by exerting a preload force against it, for example, to reduce the amount of applied external force required to move the support arm and supported portion of the cutterbar upwardly. This is desirable and advantageous, as it can improve the cutterbar flex reaction to upwardly extending ground irregularities and increased firmness and hardness, resulting in smoother operation with less jarring. It can also act to limit the downward flexure of the cutterbar into ground depressions and the like.

In many instances, it is desirable for the cutterbar to be adjustably movable also in a fore and aft direction in relation to crop gathering and collecting apparatus such as a reel and an auger or draper belt of the header, for adapting to different crop varieties and conditions. However, as the cutterbar is moved fore or aft relative to its pivot or other point of support, the effect of the preload, e.g., ground following characteristics, can change also, which may be undesirable and negatively impact the harvesting and/or gathering operation. For instance, if the cutterbar is moved in the forward direction, the center of gravity thereof may be moved more distant from the pivot point, thus reducing the preload effect. Conversely, if the cutterbar is retracted, the effective preload may be increased.

What is sought therefore, is a header with a fore and aft adjustable flexible cutterbar, which provides a capability for automatically adjusting a preload force exerted against the cutterbar as a function of the fore and aft position thereof, and which overcomes one or more of the disadvantages and shortcomings, set forth above.

SUMMARY OF THE INVENTION

What is disclosed is a header with a fore and aft adjustable flexible cutterbar, which provides a capability for automatically adjusting a preload force exerted against the cutterbar as a function of the fore and aft position thereof, and which overcomes one or more of the disadvantages and shortcomings, set forth above.

According to a preferred aspect of the invention, the header includes an elongate pan or floor, and a plurality of elongate support arms pivotally connected to the floor or elements in connection therewith, e.g., a frame of the header, and supporting a flexible cutterbar for upward and downward movement relative thereto. The support arms are configured to have a variable length, e.g., a telescoping construction, for varying a fore and aft position of the cutterbar relative to the floor, and the header includes adjustable biasing elements connected between the floor and at least some of the support arms, the biasing elements being configured and operable for yieldably exerting a preload force against the support arms, typically for urging the cutterbar upwardly. The header includes a preload adjusting system in connection with the adjustable biasing elements and the cutterbar, configured to automatically vary the preload force as a function of the fore and aft position of the cutter bar.

According to another preferred aspect of the invention, at least one of the support arms comprises a member carrying a portion of the cutterbar and movable in a fore and aft direction relative to the floor for changing the fore and aft position of the portion of the cutterbar, and the preload adjusting system includes an element, e.g., a sensor or sensors, configured and operable for generating information representative of the fore and aft position. As a preferred example, one or more of the support arms can include a rack and pinion arrangement operable to produce rotation of the pinion representative of the fore and aft movements for this purpose, and a potentiometer or other suitable sensor can be configured and operable for sensing the pinion rotation. Several of the rack and pinions can be used and can be connected together, e.g., via a shaft, to move the cutterbar uniformly along its width, and to provide one indicator of the fore and aft position of the cutterbar. The pinion can be coaxial with the pivot joints of the support arms. Alternative sensors can include a displacement sensor, such as a linear displacement sensor or the like, operable for sensing changes in the position of the movable portion of the support arm.

As another preferred example, the adjustable biasing elements comprise one or more torsion springs and the preload adjusting system includes elements in connection with the cutterbar for movement therewith in the fore and aft directions in a manner for uniformly changing torsion in the spring or springs corresponding to the fore and aft movements of the cutterbar to vary the preload force. Here, the elements can comprise cables, which can wind about reels connected to the torsion springs by force multipliers such that movements of the cutterbar in the fore direction will pull the cables so as to change the torsion of the torsion springs in a first manner, and movements of the cutterbar in the aft direction will change the torsion in another manner. As an example of a suitable force multiplier, a gearbox can be used. As another example, a lever or torque arm can be used that will increase torsion of the spring as the cutterbar is extended forwardly, and reduce it as the cutterbar is retracted.

According to another preferred aspect of the invention, the biasing elements comprise at least one fluid cylinder in fluid connection with an accumulator, and the preload adjusting system device is connected in operative control of an element operable for varying a pressure in the fluid cylinder and the accumulator responsive to the information, to vary the preload force. As another alternative, the fluid cylinder can be used in combination with the torsion spring arrangement and force multiplier.

DETAILED DESCRIPTION OF THE INVENTION

Figure 1:
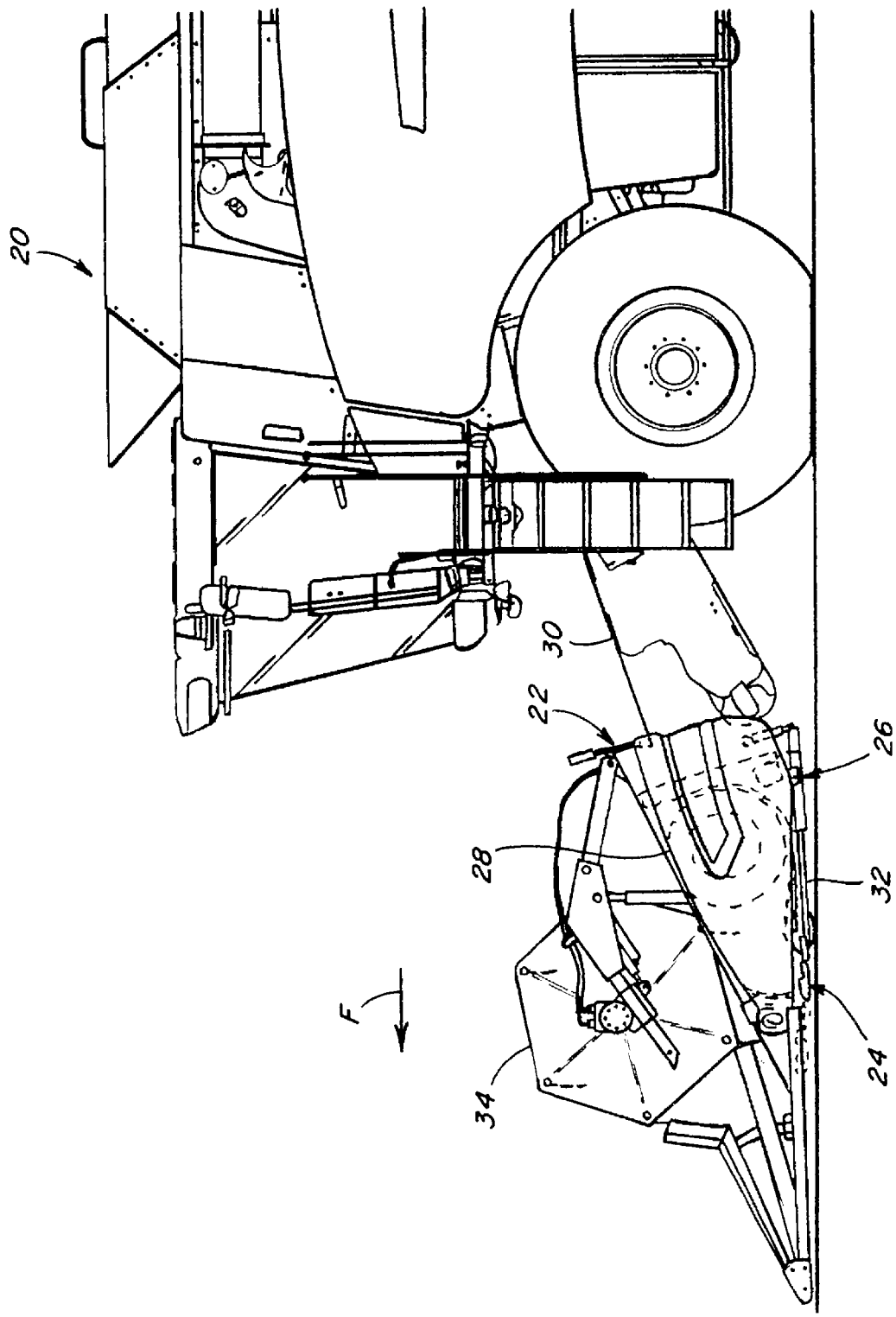
FIG. 1 is a simplified fragmentary side view of the front end of an agricultural combine, including a header having a fore and aft adjustable flexible cutterbar with automatically adjustable preload according to the invention.

Referring to FIG. 1, a self-propelled combine 20 is shown, including a header 22 with a flexible cutterbar 24 configured for fore and aft movement, and a preload adjusting system 26 constructed and operable according to the teachings of the present invention. Cutterbar 24 is a conventionally constructed and operable sickle type cutter made of steel and including an elongate end-to-end array of knife sections reciprocatingly movable in a side-to-side direction relative to fixed cutter guards, for severing crops from a field as combine 20 is moved forwardly thereover, as denoted by arrow F. Header 22 additionally includes a conveyor arrangement 28 operable for gathering the cut crops, and conveying them to a center region of header 22, and into a feeder 30 of combine 20, in the well-known manner. Here, conveyor arrangement 28 is of a helical auger style, but it should be recognized and understood that, alternatively, the conveyor arrangement could be configured as a draper type. Here also, although preload adjusting system 26 is shown in association with a header of a combine, it should be recognized that it could be utilized with a header of a windrower or another plant cutting machine. Combine 20 is also of conventional construction and operation, for separating grain from the cut crops, collecting the grain, and discharging the material other than grain. For windrower applications, combine 20 would be replaced by a tractor.

Here, it should be noted that in FIG. 1, cutterbar 24 is illustrated configured in a float mode, such that portions of cutterbar 24 along the width (the side to side direction in relation to combine 20) are in effect supported all or in part by contact with a ground surface therebeneath, and such that the cutterbar will sever the crops at or just above the ground surface. This mode is typically used for harvesting crops such as soybeans and other legumes. The flexible construction of cutterbar 24 allows a limited range of upward and downward movement of individual regions thereof, for conforming to contours of the ground surface, to maintain a generally uniform cutting height, and such that impacts and jarring that can result from contact with raised surface contours and irregularities, e.g., furrow ridges, clumps, rocks, and the like, are reduced. This flex capability may be provided in association with a header height control system (not shown) automatically operable for raising header 22 responsive to a certain extent of upward movement of cutterbar 24, and lowering the header responsive to a certain extent of downward movement, in the well-known manner.

Figure 3:
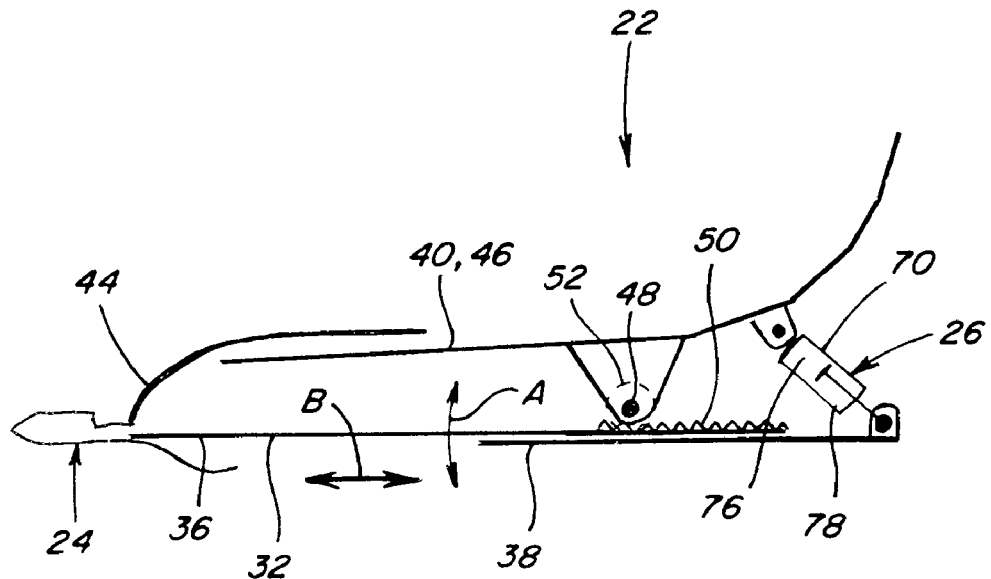
FIG. 3 is another simplified fragmentary side view of the header, with the cutterbar in a retracted rearward position and arrows illustrating possible movements thereof.
Figure 4:
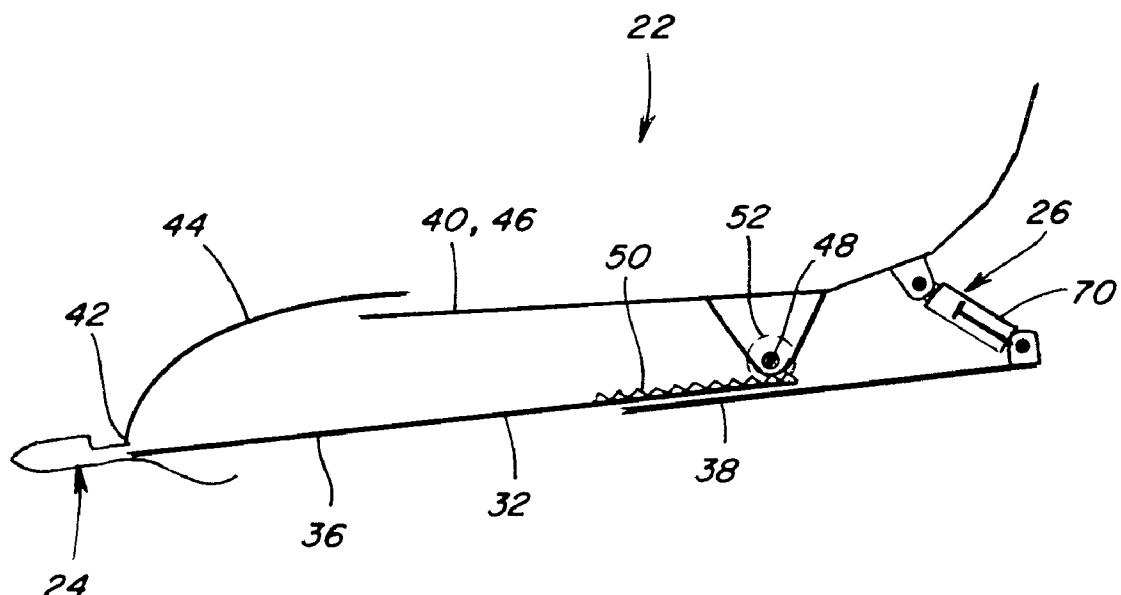
FIG. 4 is another simplified fragmentary side view of the header, with the cutterbar in an extended forward position.
Figure 5:
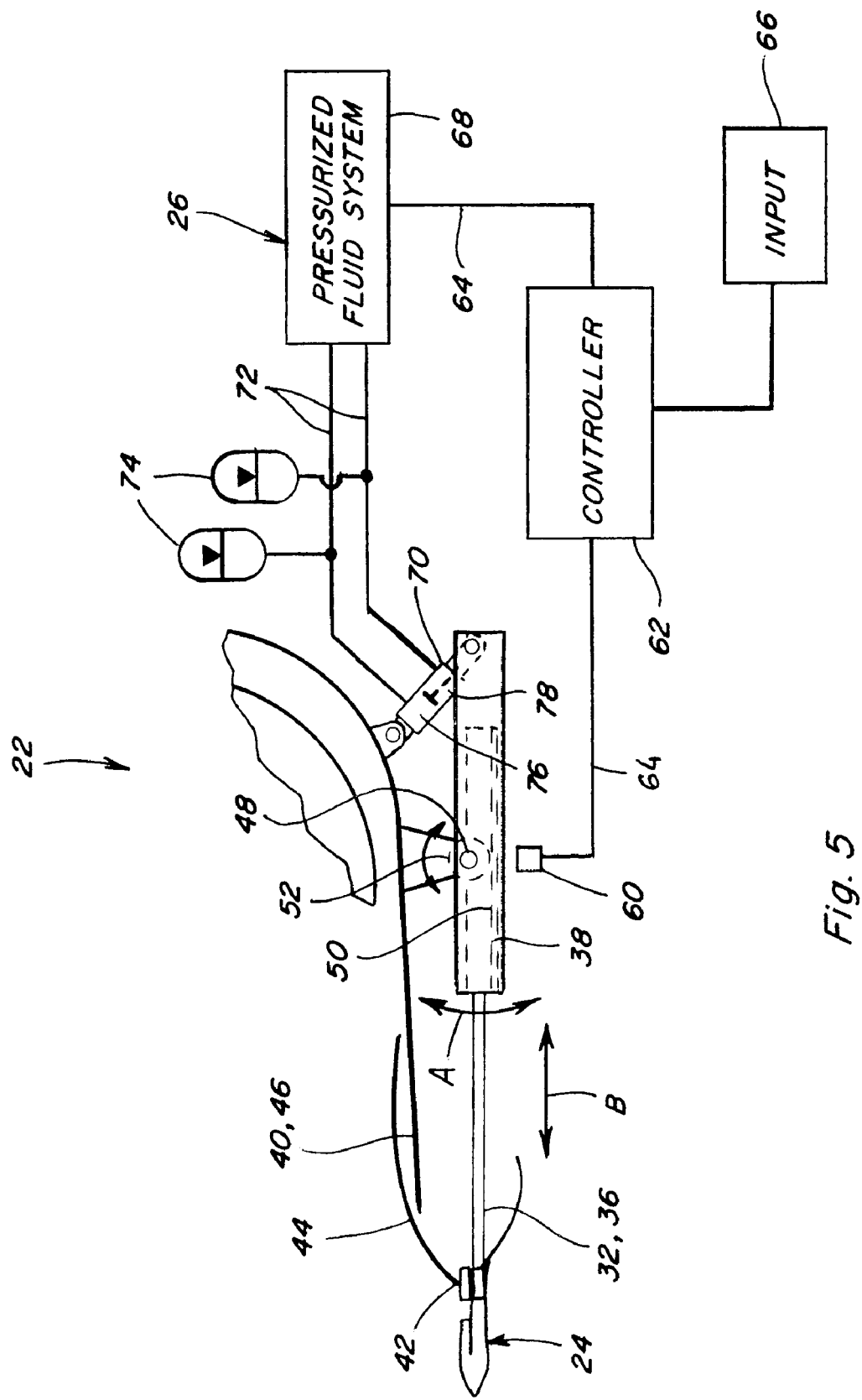
FIG. 5 is still another simplified fragmentary side view of the header, with arrows illustrating possible movements of the cutterbar, and additional aspects of the preload adjusting system.

Referring also to FIGS. 2 through 6, cutterbar 24 of header 22 is supported by support apparatus 32 disposed at spaced locations along the width thereof, for upward and downward movement, as illustrated by arrows A in FIGS. 1, 3 and 5, to facilitate the flexing thereof. A typical header 22 and cutterbar 24 may be as much as 40 or more feet wide, and support apparatus 32 will provide sufficient flexibility to allow spaced apart regions of the cutterbar to be simultaneously located at different elevations, which may be required for providing desired ground contour following capabilities. In addition to providing flexibility, cutterbar 24 and support apparatus 32 will have sufficient robustness so as to be capable of withstanding intermittent contacts and impacts with ground features, e.g., raised areas, furrow ridges, logs, rocks, etc., over the course of use.

Figure 2:
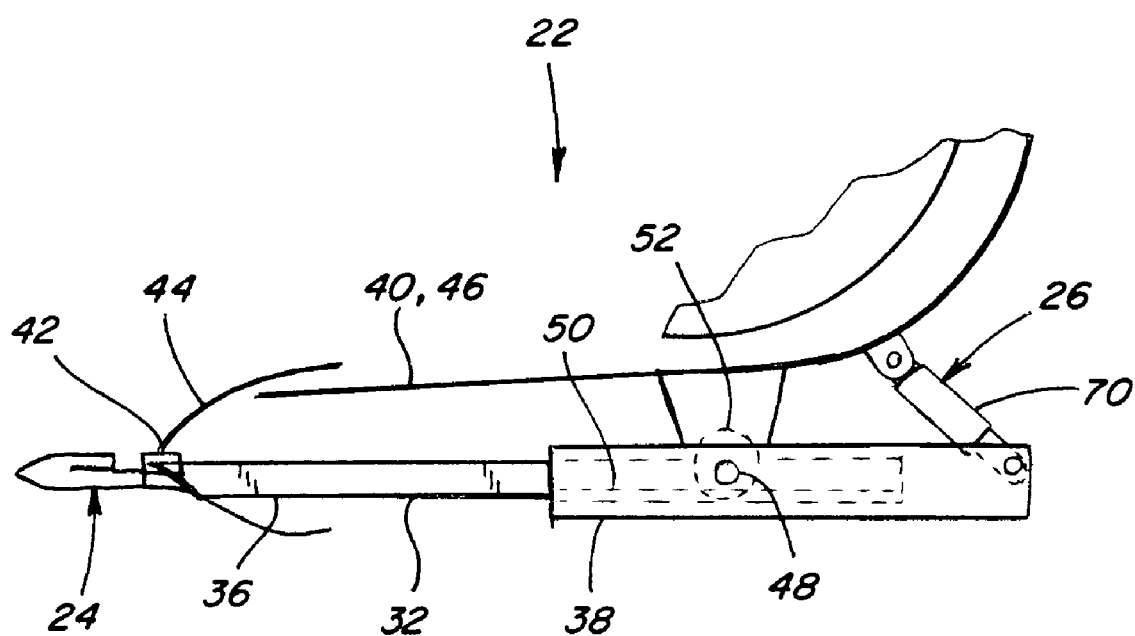
FIG. 2 is a simplified fragmentary side view of the header of FIG. 1, showing aspects of the cutterbar and a preload adjusting system of the invention.
Figure 2A:
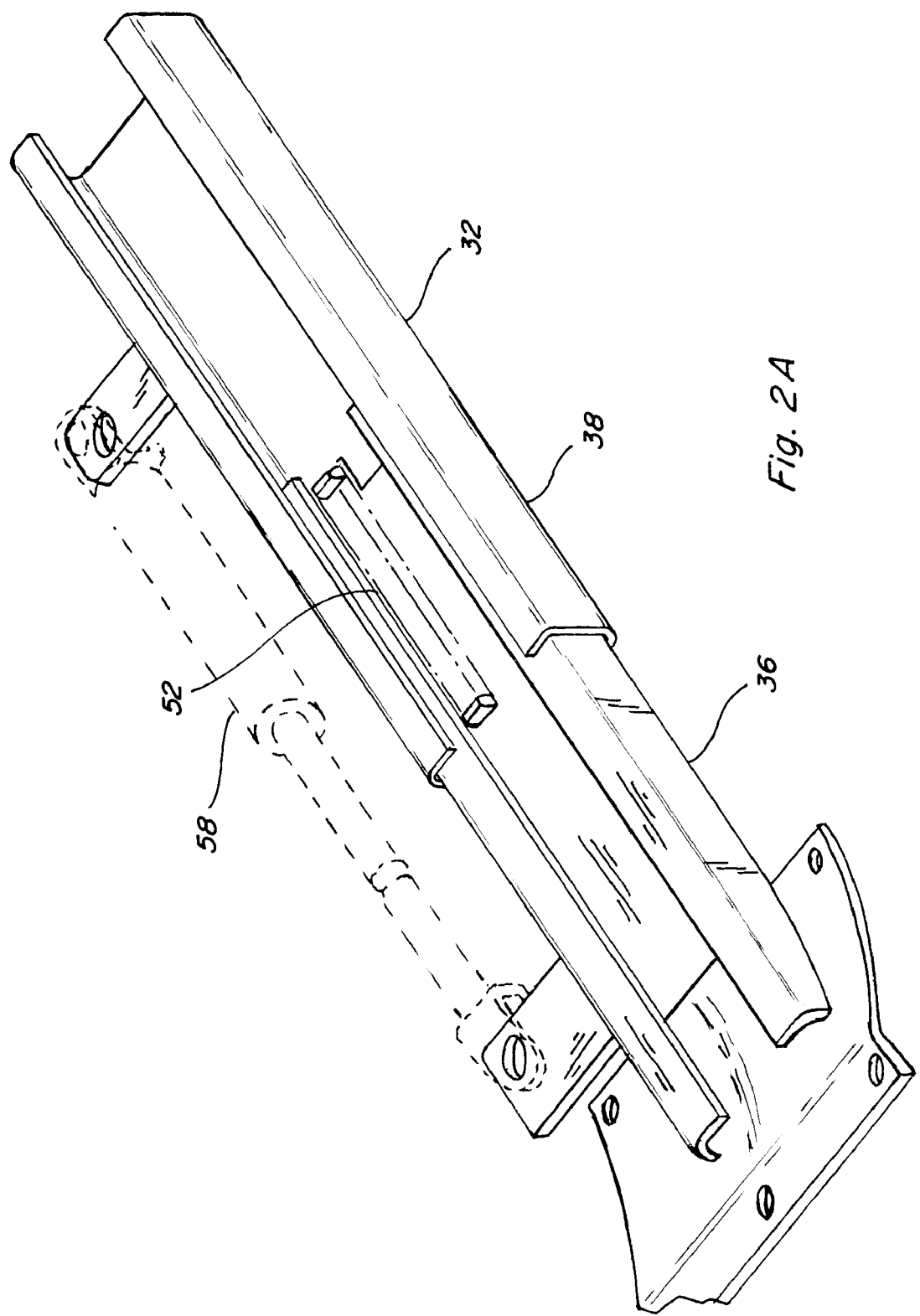
FIG. 2A is an enlarged fragmentary perspective view of aspects of the header and preload adjusting system.

Cutterbar 24 is configured to be movable in the fore (forward) and aft (rearward) directions, as denoted by arrows B in FIGS. 1, 3 and 5, to facilitate cutting and gathering in cooperation with conveyor arrangement 28, and also a reel 34 of header 22. To enable this capability, each of support apparatus 32 preferably comprises suitable structure, of steel or other suitable metal, here, a telescoping arm assembly (as best illustrated in FIG. 2A) including a forwardly located first arm 36 having a forwardmost end attached to and supporting cutterbar 24, extending telescopically from a rearwardly located second arm 38 pivotally connected to a structural element of header 22 at a more rearward location. Each support apparatus 32 is disposed beneath or integrated with a pan or floor 40 of header 22, such that cutterbar 24 projects forwardly from a forwardmost edge 42 thereof. To accommodate this, floor 40 is also preferably of telescoping construction, including a forward section 44 including forwardmost edge 42, suitably configured for flexure, such as by overlapping panels in connection with cutterbar 24 at locations along the width thereof, for upward, downward, forward, and rearward movement therewith relative to a rear section 46 located beneath conveyor arrangement 28.

Second arm 38 of each support apparatus 32 is pivotally connected to a suitable structural element of header 22, e.g., rear section 46 of floor 40, preferably by a hinge or pinned pivot joint 48, to enable the upward and downward pivotal movement of cutterbar 24 and the associated portion or portions of forward section 44 of the floor. To facilitate uniform fore and aft movement of first arms 36 relative to the second arms 38, and thus uniform fore and aft movement of the cutterbar along its width, while allowing upward and downward pivotal movement of various of the support apparatus 32 for allowing flexure of regions or portions of cutterbar 24, header 22 preferably incorporates a synchronization mechanism 50. Here, a preferred mechanism 50 comprises racks 52 on first arms 36, respectively, enmeshed with pinions 54 mounted on the associated second arms 38 or otherwise suitably connected to header 22, so as to be fixed relative to the fore and aft direction. Pinions 54 are fixedly mounted coaxially to a shaft 56 which extends sidewardly along header 22, for joint rotation. As a result, as first arms 36 are moved relative to second arms 38 for extending or retracting cutterbar 24, racks 52 will move relative to pinions 54, to cause their uniform and simultaneous rotation. Pinions 54 can be coaxial with pivot joints 48 such that support apparatus 32 will pivot thereabout.

Figure 6:
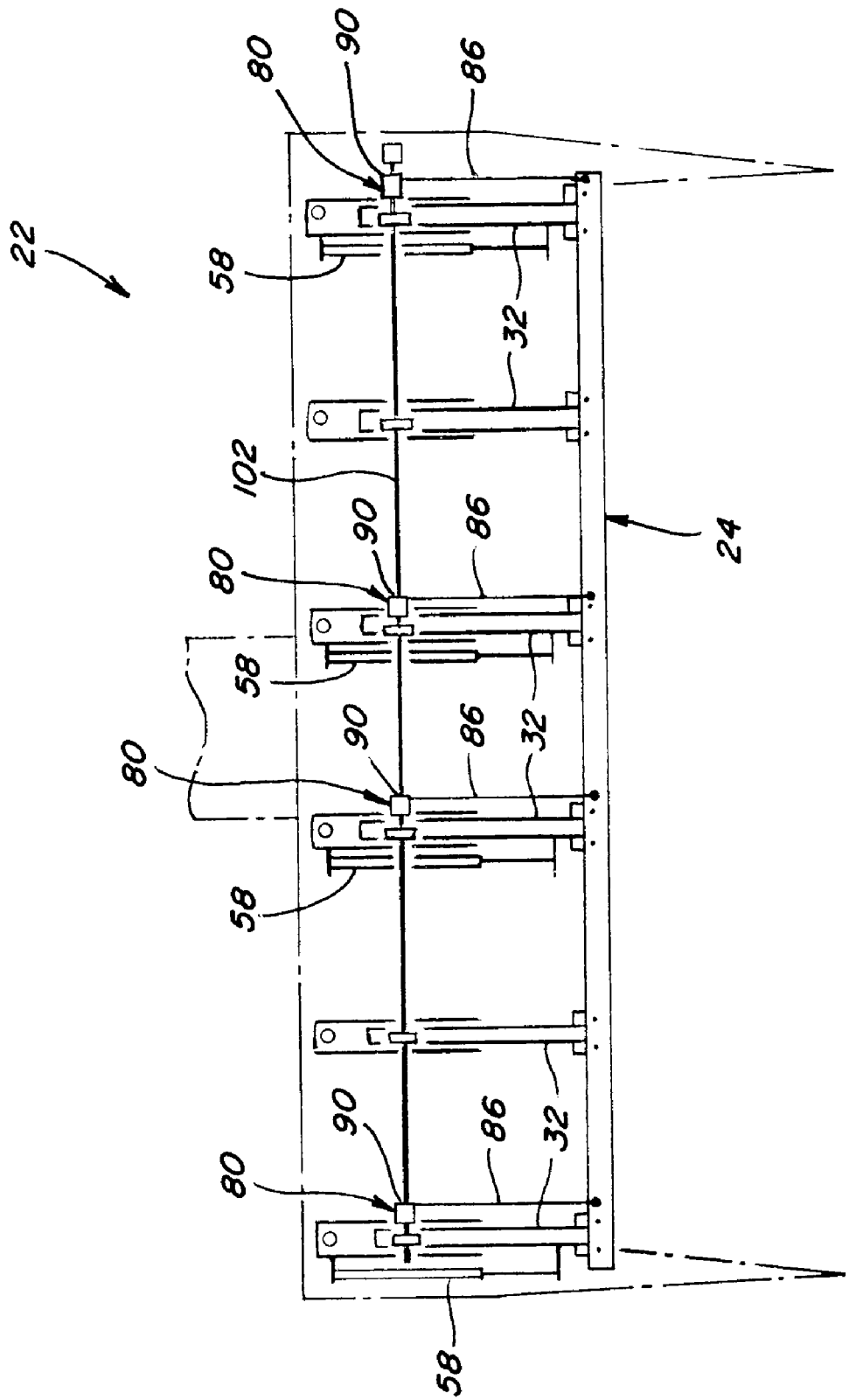
FIG. 6 is a simplified top view of the header, showing aspects of an alternative embodiment of a preload adjusting system of the invention.

The uniform fore and aft movements of cutterbar 24, forward section 44 of floor 40, and first arms 36, as well as the synchronized rotation of pinions 54, can be effected using any suitable driver or drivers 58, which can be, for instance, one or more fluid cylinders or other linear actuators connected between cutterbar 24 or one or more of first arms 36, and second arm 38, or a fore and aft fixed portion of header 22, such as rear section 46 of floor 40, as illustrated in FIGS. 2A and 6, under control of a suitable input device, which can be, for example, a switch or touch screen located in the operator cabin of the combine (not shown). In the configuration shown, extension of drivers 58 will cause forward extension of the cutterbar 24, and retraction of drivers 58 will cause retraction of the cutterbar, although other configurations, e.g. linear actuators, could alternatively be used. As these fore and aft driver movement occur, pinions 54 will be rotated in unison by corresponding movements of the racks 52, such that the cutterbar is uniformly moved.

Information representative of the fore and aft position of cutterbar 24 is useful to provide feedback if desired, and by preload adjusting system 26 for applying and adjusting a preload force as will be explained. This positional information can be provided using a suitable device, such as by a suitable position sensor 60, which can be, for example: a rotary sensor, such as a potentiometer, operable for sensing a rotational position of a pinion, or pinions 54 via shaft 56; a linear position sensor; a proximity sensor; optical sensor, or the like.

Referring more particularly to FIG. 5, wherein one preferred configuration of preload adjusting system 26 is shown, system 26 includes a processor based controller 62 in connection with sensor 60 via a suitable communications path 64 such as a wiring harness, wired or wireless communications network, for receiving signals from sensor 60 representative of the fore and aft position of cutterbar 24. Controller 62 is also connected by a communications path 64 to an input device 66 usable by an operator to select and input commands, and to a biasing element for generating the preload force, which here comprises a pressurized fluid cylinder or cylinders 70 in connection with a fluid system 68. Fluid system 68 will include a fluid pump configured and operable in the well known manner for generating a supply of pressurized fluid and delivering the pressurized fluid to the one or more fluid cylinders 70, via fluid paths 72. One or more of fluid paths 72 can also include an accumulator 74 (two illustrated) to provide resilient yielding movement responsive to externally applied loads, e.g., contact between cutterbar 24 and raised ground surface features, obstacles, and the like, and return to the equilibrium or normal position when the cutterbar has passed that condition, while damping associated shock.

Each fluid cylinder 70 comprising the biasing elements of system 26, as illustrated here is pivotally connected to, and extends between, the rear end of support apparatus 32 and a rear portion of floor 40 or other suitable structure of the header. Each fluid cylinder 70 is conventionally constructed and operable, including a piston end chamber 76 and a rod end chamber 78, connected to respective fluid paths 72, for receiving and holding fluid.

Operationally, it will typically be desired for cutterbar 24 to have a free state normal or equilibrium pivotal position about as shown in FIG. 5, so as to have some ability to pivot both up and down as required for following ground surface contours, and with the preload force constituting an upwardly directed force acting against cutterbar 24 to counterbalance at least a portion of the weight of the cutterbar and support apparatus 32 and thus the down force exerted thereby. The net effect is that when an upwardly extending ground surface contour or feature is encountered, less upward force will be required to raise cutterbar 24 over that contour or feature, and the dropping of the cutterbar after passage thereover will be less abrupt and forceful. This is advantageous as it reduces shock, vibration, and other stress on the header and related apparatus that could possibly cause damage, ground scalping and other problems.

At times, it is anticipated that an operator will desire, or be required, to adjust the amount of the preload force, e.g., increase it, for decreasing down force, ground scalping, shock and other conditions, for instance, when harvesting from rougher sections of fields, uneven terrain, and any of a variety of other reasons. Additionally, as cutterbar 24 is moved fore and aft relative to floor 40, the distance from the cutterbar to pivot joint 48 will change, which will in turn change the net down force, and thus necessitate adjusting the preload force for maintaining a desired or set down force value. In particular, as a general rule, moving the cutterbar forward to thereby increase the length of telescoping support apparatus 32 will tend to increase the force moment exerted by the weight thereof about pivot joint 48, and thus the net down force, and moving the cutterbar rearward will tend to decrease down force. The change in down force will be a proportional function of the fore and aft cutterbar position, which will be sensed by sensor 60.

Preload adjusting system 26 is configured and operable for varying or changing the preload force responsive to commands inputted by an operator using input 66 for varying down force. Additionally, system 26 is configured to automatically operate to vary the preload force responsive to fore and aft movements of the cutterbar, to maintain the down force at the set value. This is effected under control of controller 62, by changing the fluid pressures in chambers 76 and 78 of fluid cylinders 70 and the respective associated lines 72 and accumulators 74. As noted above, forward extension of cutterbar 24 will increase net down force, and retraction will reduce it, both of which movements will be detected by sensor or sensors 60. As configured, system 26 will automatically compensate for or cancel such net increase in the down force by increasing fluid pressure in piston end chamber 76 and/or reducing pressure in rod end chamber 78; and will compensate for by a decrease by decreasing pressure in chamber 76 and/or increasing it in chamber 78.

Figure 7:
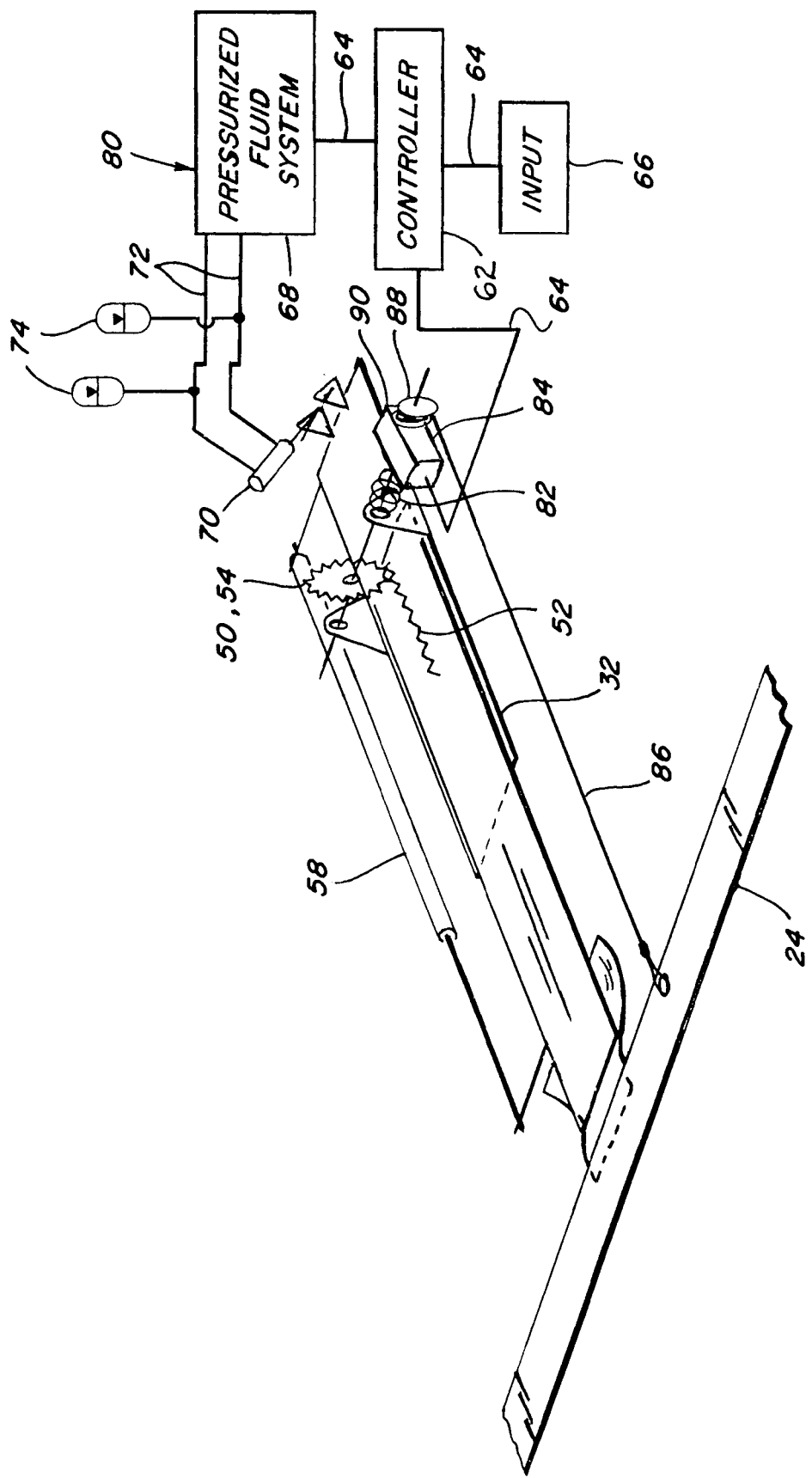
FIG. 7 is a simplified schematic perspective view of the header, showing aspects of the preload adjusting system of FIG. 6.
Figure 8:
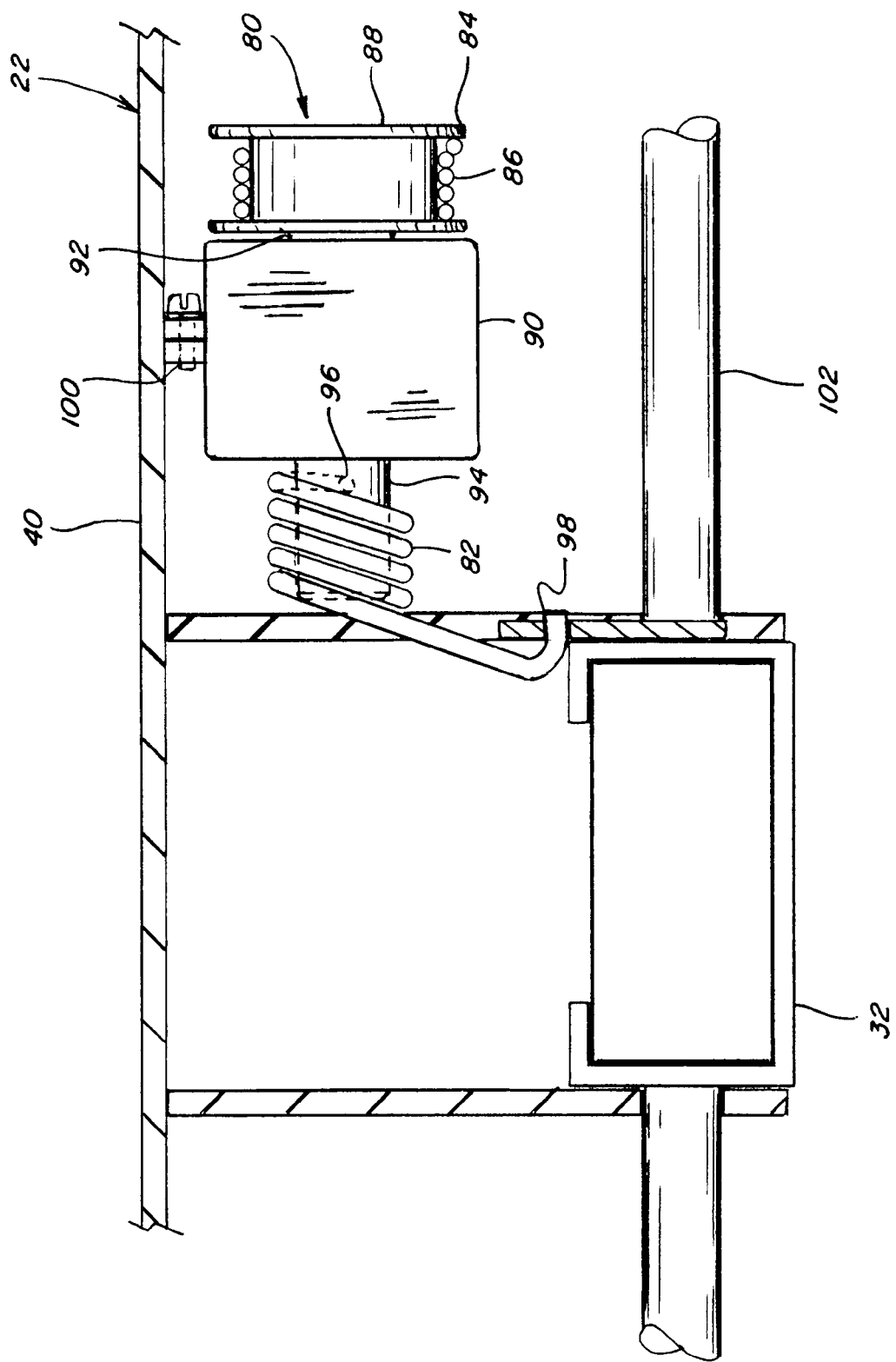
FIG. 8 is a simplified sectional view of the header, showing additional aspects of the preload adjusting system of FIGS. 6 and 7.

FIGS. 6, 7 and 8 illustrate an alternative embodiment of a preload adjusting system 80 of the invention, shown in association with header 22, cutterbar 24 and support apparatus 32. System 80 utilizes elements of system 26, including biasing elements comprising fluid cylinders 70 in association with support elements 32. In a version shown in FIG. 7, system 80 additionally includes the other above discussed aspects of fluid system 68, including controller 62, input device 66, accumulators 74, and connecting communications and fluid paths 64 and 72, to enable selecting and setting a down force in the above described manner. Drivers 58 are also used for extending and retracting the cutterbar as before. System 80 additionally includes adjustable biasing elements which comprise torsion springs 82 in connection with some or all of support apparatus 32, and apparatus 84 for mechanically automatically and uniformly varying the torsion in springs 82 with or proportional to the fore and aft movements of cutterbar 24, such that the springs 82 will exert a portion or component of the preload force, which component will be automatically varied with cutterbar fore and aft position for maintaining a set down force. This can be done while maintaining a constant preload force generated by cylinders 70 in the above described manner, or in conjunction or cooperation with variations in that force component.

Here, apparatus 84 comprises cables 86, which wind about reels 88 connected to torsion springs 82 by force multipliers 90, such that movements of cutterbar 24 in the fore direction will pull cables 86 so as to change the torsion in torsion springs 82 in a first manner, and movements of the cutterbar in the aft direction will change the torsion in another manner. Here also, illustrated force multipliers 90 comprise gearboxes, each having a first shaft 92 connected to and supporting a reel 88, and a second shaft 94 in connection with the associated spring 82, shafts 92 and 94 being connected together by a gear arrangement within the gearbox having a ratio whereby rotation of first shaft 92 will cause a lesser degree of rotation of second shaft 94. One end of spring 82 is connected to first shaft 94 at connection 96 and the opposite end is connected to support apparatus 32 at connection 98, and the gear box is fixed to the underside of floor 40 of header 12 or other suitable fixed structure by a connection 100, such that unwinding or pulling of cable 86 about reel 88 as cutterbar 24 is extended forwardly will cooperatively rotate first shaft 92 in a manner for rotating second shaft 94 for increasing the torsion in spring 82, and thus that component of the preload force, and retraction of cutterbar 24 will allow spring 82 to cooperatively rotate second shaft 94 to in turn rotate first shaft 92 to a greater extent to wind or take up more of cable 86 about reel 88, to thereby reduce the torsion in the spring and thus that component of the preload force. Additionally, the changes in torsion in spring 82 resulting from winding and unwinding it and the effect on the preload force generated thereby will correspond directly with the changes in fore and aft position of the cutterbar, such that the preload force exerted against support apparatus 32 will adjust to and offset the changes the down force resulting from the fore and aft movements of the cutterbar, such that there will be no, or only an inconsequential, net down force change.

Here, a pivot shaft 102 is shown extending between support apparatus 32 of header 22, for synchronizing the fore and aft movements thereof. Shaft 102 can be coaxial with apparatus such as pinions 54 of the respective apparatus 32, which, in turn, can be coaxial with shafts 92 and 94, or offset therefrom, as desired. Here, it should also be recognized that it is contemplated that the cable and gearbox type force multiplier, and torsion spring arrangement of system 88 represents just one of several spring type mechanisms that could be employed according to the invention for varying a spring force providing or counteracting a preload acting on a cutterbar corresponding with changes in the fore and aft position of the cutterbar, and that, as a result, the present invention is not intended to be limited to just the mechanism illustrated. As an example of another alternative, a torque arm or arms could be connected between the telescoping arm or arms of support apparatus 32 or between first arm 36 and floor 40 or other fixed structure, and configured to decrease or increase spring torsion with and proportional to fore and aft cutterbar movements.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A header for an agricultural plant cutting machine, comprising:
    an elongate floor;
    a plurality of elongate support arms operably connected to the floor and supporting a flexible cutterbar for upward and downward movement relative to the floor, the support arms being configured to have a variable length for varying a fore and aft position of the cutterbar relative to the floor;
    adjustable biasing elements connected between the floor and at least some of the support arms, respectively, the biasing elements being configured and operable for yieldably exerting a preload force against the support arms, respectively, urging the cutterbar upwardly or downwardly; and
    a preload adjusting system in connection with the adjustable biasing elements and the cutterbar configured to automatically vary the preload force as a function of the fore and aft position of the cutter bar,
    wherein at least one of the support arms comprises a rack carrying a portion of the cutterbar and movable in a fore and aft direction relative to the floor for changing the fore and aft position of the portion of the cutterbar, and
    wherein the preload adjusting system comprises a pinion in an enmeshed connection with the rack or the cutterbar, configured to move in a manner corresponding to the fore and aft movements of the cutterbar, such that the movement in the manner corresponding to the fore and aft movements will comprise a rotary movement of the pinion.

2. The header of claim 1, wherein the plurality of elongate support arms are pivotally connected to the floor by pivot joints, respectively.

3. The header of claim 1, wherein the pinion is mounted on a shaft rotatable therewith about a pivotal axis therethrough and connected to a device configured and operable to sense the rotation of the shaft and input information representative thereof to the preload adjusting system.

4. The header of claim 3, wherein the biasing elements comprise at least one fluid cylinder in fluid connection with an accumulator, and the preload adjusting system device is connected in operative control of an element operable for varying a pressure in the fluid cylinder and the accumulator responsive to the information, to vary the preload force.

5. The header of claim 3, wherein the device configured and operable to sense the rotation of the shaft comprises a potentiometer.

6. A header for an agricultural plant cutting machine, comprising:
    an elongate floor;
    a plurality of elongate support arms operably connected to the floor and supporting a flexible cutterbar for upward and downward movement relative to the floor, the support arms being configured to have a variable length for varying a fore and aft position of the cutterbar relative to the floor;

adjustable biasing elements including torsion springs connected between the floor and at least some of the support arms, respectively, the biasing elements being configured and operable for yieldably exerting a preload force against the support arms, respectively, urging the cutterbar upwardly or downwardly; and a preload adjusting system in connection with the torsion springs and the cutterbar configured to automatically vary the preload force as a function of the fore and aft position of the cutter bar, the preload adjusting system including cables in connection with the cutterbar for movement therewith in the fore and aft directions in a manner for uniformly changing torsion in the springs corresponding to the fore and aft movements of the cutterbar to vary the preload force, and wherein the cables wind about reels connected to the torsion springs by force multipliers such that movements of the cutterbar in the fore direction will pull the cables so as to change the torsion of the torsion springs in a first manner, and movements of the cutterbar in the aft direction will change the torsion in another manner.

7. The header of claim 6, wherein the force multipliers comprise gearboxes.

8. A header for an agricultural plant cutting machine, comprising:

an elongate floor;

a plurality of elongate support arms operably connected to the floor and supporting a flexible cutterbar for upward and downward movement relative to the floor, the support arms being configured to have a variable length for varying a fore and aft position of the cutterbar relative to the floor;

adjustable biasing elements connected between the floor and at least some of the support arms, respectively, the biasing elements being configured and operable for yieldably exerting a preload force against the support arms, respectively, urging the cutterbar upwardly or downwardly; and a preload adjusting system in connection with the adjustable biasing elements and the cutterbar configured to automatically vary the preload force as a function of the fore and aft position of the cutter bar, the preload adjusting system comprising a pinion in an engaged connection with a rack carrying a portion of the cutterbar and movable in a fore and aft direction relative to the floor for changing the fore and aft position of the portion of the cutterbar, the pinion configured to move in a manner corresponding to the fore and aft movements of the cutterbar, such that a rotary movement of the pinion in its engaged position with the rack will cause a corresponding fore or aft movement of at least the portion of the cutterbar.

9. The header of claim 8, wherein at least one of the support arms comprises a telescoping member.

10. The header of claim 8, wherein the biasing elements comprise at least one fluid cylinder in fluid connection with an accumulator, and the preload adjusting system device is connected in operative control of an element operable for varying a pressure in the fluid cylinder to vary the preload force.

11. The header of claim 8, wherein the preload adjusting system includes a gear which rotates with the fore and aft movements of the cutterbar and the system is configured to automatically vary the preload force as a function of a rotational position of the gear.

12. The header of claim 11, wherein the preload adjusting system includes a device configured and operable for sensing the rotational position of the gear.

13. The header of claim 12, wherein the device for sensing the rotational position of the gear comprises a potentiometer.

14. A header for an agricultural plant cutting machine, comprising:

an elongate floor;

a plurality of elongate support arms operably connected to the floor and supporting a flexible cutterbar for upward and downward movement relative to the floor, the support arms being configured to have a variable length for varying a fore and aft position of the cutterbar relative to the floor;

adjustable biasing elements including torsion springs connected between the floor and at least some of the support arms, respectively, the biasing elements being configured and operable for yieldably exerting a preload force against the support arms, respectively, urging the cutterbar upwardly or downwardly; and a preload adjusting system in connection with the torsion springs and the cutterbar configured to automatically vary the preload force as a function of the fore and aft position of the cutter bar, the preload adjusting system including cables wound about reels connected to the torsion springs by force multipliers, the preload adjusting system in connection with the cutterbar for movement therewith in the fore and aft directions in a manner for uniformly changing torsion in the springs corresponding to the fore and aft movements of the cutterbar to vary the preload force, such that movements of the cutterbar in the fore direction will pull the cables so as to change the torsion of the torsion springs in a first manner, and movements of the cutterbar in the aft direction will change the torsion in another manner.

15. The header of claim 14, wherein at least one of the support arms comprises a telescoping member.

16. The header of claim 14, wherein the biasing elements comprise at least one fluid cylinder in fluid connection with an accumulator, and the preload adjusting system device is connected in operative control of an element operable for varying a pressure in the fluid cylinder to vary the preload force.

17. The header of claim 14, wherein the preload adjusting system includes a gear which rotates with the fore and aft movements of the cutterbar and the system is configured to automatically vary the preload force as a function of a rotational position of the gear.

18. The header of claim 17, wherein the preload adjusting system includes a device configured and operable for sensing the rotational position of the gear.

19. The header of claim 18, wherein the device for sensing the rotational position of the gear comprises a potentiometer.

* * * * *